(12) United States Patent
Alumbaugh et al.

(10) Patent No.: US 9,103,927 B2
(45) Date of Patent: Aug. 11, 2015

(54) PROVIDING A TOW CABLE HAVING PLURAL ELECTROMAGNETIC RECEIVERS AND ONE OR MORE ELECTROMAGNETIC SOURCES

(75) Inventors: David L. Alumbaugh, Berkeley, CA (US); Guozhong Gao, Arlington, MA (US); Tarek M. Habashy, Burlington, MA (US); H. Frank Morrison, Berkeley, CA (US); Michael Oristaglio, Newton, CT (US); Kambiz A. Safinya, Houston, TX (US); Andrea Zerilli, Rio de Janeiro (BR)

(73) Assignee: WESTERNGECO L.L.C., Houston, TX (US)

( * ) Notice: Subject to any disclaimer, the term of this patent is extended or adjusted under 35 U.S.C. 154(b) by 828 days.

(21) Appl. No.: 13/343,086

(22) Filed: Jan. 4, 2012

(65) Prior Publication Data
US 2012/0116679 A1    May 10, 2012

Related U.S. Application Data

(62) Division of application No. 12/349,861, filed on Jan. 7, 2009, now Pat. No. 8,115,491.

(51) Int. Cl.
*G01V 3/12* (2006.01)
*G01V 3/04* (2006.01)
*G01V 3/06* (2006.01)
*G01V 3/08* (2006.01)

(52) U.S. Cl.
CPC . *G01V 3/12* (2013.01); *G01V 3/083* (2013.01)

(58) Field of Classification Search
USPC .......................................................... 324/365
See application file for complete search history.

(56) References Cited

U.S. PATENT DOCUMENTS

| 4,617,518 A | 10/1986 | Srnka |
| 6,023,168 A | 2/2000 | Minerbo |
| 6,603,313 B1 | 8/2003 | Srnka |
| 8,008,921 B2 | 8/2011 | Alumbaugh et al. |
| 8,115,491 B2 | 2/2012 | Alumbaugh et al. |
| 8,249,812 B2 * | 8/2012 | Abubakar et al. ................. 702/7 |
| 8,278,928 B2 * | 10/2012 | Bespalov ...................... 324/326 |
| 2001/0046185 A1 | 11/2001 | Hornbostel |
| 2005/0093547 A1 * | 5/2005 | Xiao et al. .................... 324/339 |
| 2007/0135974 A1 | 6/2007 | Fielding |
| 2007/0229083 A1 | 10/2007 | Tenghamn et al. |

(Continued)

FOREIGN PATENT DOCUMENTS

| EP | 0905351 A2 | 3/1999 |
| WO | 2004008183 A2 | 1/2004 |

(Continued)

OTHER PUBLICATIONS

International Search Report and Written Opinion of PCT Application No. PCT/US2010/020258 dated Aug. 31, 2010: pp. 1-12.

(Continued)

*Primary Examiner* — Bot Ledynh (57) ABSTRACT

To perform marine electromagnetic (EM) surveying of a subterranean structure, a marine cable system is provided including a tow cable, a plurality of electromagnetic (EM) sources coupled to the tow cable, and a plurality of EM receivers coupled to the tow cable. The system is configured for deployment in a body of water to perform marine EM surveying of a subterranean structure.

15 Claims, 7 Drawing Sheets

(56) References Cited

U.S. PATENT DOCUMENTS

| | | |
|---|---|---|
| 2007/0294036 A1 | 12/2007 | Strack |
| 2008/0008032 A1 | 1/2008 | Welker |
| 2008/0025146 A1 | 1/2008 | Welker |
| 2009/0140741 A1 | 6/2009 | Tenghamn et al. |
| 2009/0175125 A1* | 7/2009 | Khan et al. ............... 367/43 |
| 2009/0204330 A1* | 8/2009 | Thomsen et al. ............ 702/14 |
| 2009/0296519 A1 | 12/2009 | Keers et al. |
| 2010/0102821 A1 | 4/2010 | Alumbaugh |

FOREIGN PATENT DOCUMENTS

| | | | |
|---|---|---|---|
| WO | 2007006785 | A2 | 1/2007 |
| WO | 2007053025 | A1 | 5/2007 |
| WO | 2007089486 | A2 | 8/2007 |
| WO | 2008008127 | A3 | 1/2008 |

OTHER PUBLICATIONS

Chave et al., "Electrical Exploration Methods for the Seafloor," Electromagnetic Methods in Applied Geophysics, 1991, vol. 2: pp. 931-966.

Cherkaeva et al., "Optimal Survey Design Using Focused Resistivity Arrays," IEEE Transactions on Geoscience and Remote Sensing, Mar. 1996, vol. 34(2): pp. 358-366.

Davdycheva et al., "Electrical-Prospecting Method for Hydrocarbon Search Using the Induced-Polarization Effect," Geophysics, Jul.-Aug. 2006, vol. 71(4): pp. G179-G189.

Moldoveanu et al., "Over/Under Towed-Streamer Acquisition: A Method to Extend Seismic Bandwith to both Higher and Lower Frequencies," The Leading Edge, Jan. 2007: pp. 41-58.

* cited by examiner

PROVIDING A TOW CABLE HAVING PLURAL ELECTROMAGNETIC RECEIVERS AND ONE OR MORE ELECTROMAGNETIC SOURCES

CROSS-REFERENCE TO RELATED APPLICATION

This application is a divisional of U.S. application Ser. No. 12/349,861, filed on Jan. 7, 2009, now U.S. Pat. No. 8,115,491, which is hereby incorporated by reference.

BACKGROUND

Various electromagnetic techniques exist to perform surveys of a subterranean structure for identifying elements of interest. Examples of elements of interest in the subterranean structure include subsurface resistive bodies, such as hydrocarbon-bearing reservoirs, gas injection zones, thin carbonate or salt layers, and fresh-water aquifers. One survey technique is the magnetotelluric (MT) survey technique that employs time measurements of electric and magnetic fields (which are responsive to naturally occurring electromagnetic fields) for determining the electrical conductivity distribution beneath the surface. Another survey technique is the controlled source electromagnetic (CSEM) survey technique, in which an electromagnetic transmitter, called a "source," is used to generate electromagnetic signals. With either survey technique, surveying units, called "receivers," are deployed on a surface (such as at the sea floor or on land) within an area of interest to make measurements from which information about the subterranean structure can be derived. The receivers may include a number of sensors for detecting any combination of electric fields, electric currents, and magnetic fields.

In marine environment CSEM surveys, modeling and acquisition studies have shown that thin resistive targets in a subterranean structure, such as hydrocarbon-bearing reservoirs, gas injection zones, thin carbonate or salt layers, fresh water aquifers, and so forth, are more easily detectable when a CSEM source is positioned close to the sea floor. In practice, the CSEM source is towed, or "flown," as close to the sea floor as conditions will allow. Typically, the CSEM source will be towed between 30 to 50 meters above the sea floor.

Usually, when performing CSEM surveying, EM receivers are placed on the sea floor. An issue associated with deploying EM receivers on the sea floor is that such deployment is both labor and time-intensive. Also, after the surveying is completed, retrieving or recovering the EM receivers from the sea floor is also a labor and time-intensive process. Moreover, sea floor receivers tend to measure a total EM field that contains the response of not only targets of interest, but also the response of sea water, and in a shallow water environment, the response of air above the sea water.

SUMMARY

In one aspect, the invention relates to a marine cable system. The marine cable system includes a tow cable, a plurality of electromagnetic (EM) sources coupled to the tow cable and a plurality of EM receivers coupled to the tow cable. The system is configured for deployment in a body of water to perform marine EM surveying of a subterranean structure.

In one aspect, the invention relates to a method of characterizing a subsurface marine environment. The method includes deploying a surveying assembly in a body of water; said surveying assembly comprising a tow cable, one or more streamers coupled to the tow cable, a plurality of EM sources and a plurality of EM receivers coupled to each streamer. The method also includes activating at least one of the EM sources. The method also includes acquiring measurement data from the EM receivers in response to activation of the at least one EM source.

In one aspect, the invention relates to a method of removing unwanted signal components from a total electromagnetic field measured on a towed marine EM system. The method includes providing an arrangement of a pair of EM receivers around an EM source. The method also includes receiving measurement data at the pair of the EM receivers in response to activation of the EM source. The method also includes calculating a bucking coefficient based on the measurement data, and removing an unwanted signal component at the EM receivers based on the bucking coefficient.

Other or alternative features will become apparent from the following description, from the drawings, and from the claims.

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible.

In accordance with some examples, a controlled source electromagnetic (CSEM) surveying technique uses EM receivers and one or more EM sources that are mounted on a tow cable to survey a subterranean structure. The tow cable is towed by a sea vessel in a body of water. Techniques according to some examples provide the ability to focus energy downwardly into the subterranean structure of interest, and/or reduce unwanted responses from the body of water and/or from the air above the body of water. In some configurations, the tow cable includes multiple EM sources and multiple EM receivers. In other configurations, the tow cable includes a single EM source and multiple EM receivers. In yet another configuration, multiple tow cables can be used, with each tow cable having a combination of one or more EM sources and plural EM receivers. The multiple tow cables can be towed by a single sea vessel, or by multiple sea vessels.

Figure 1:
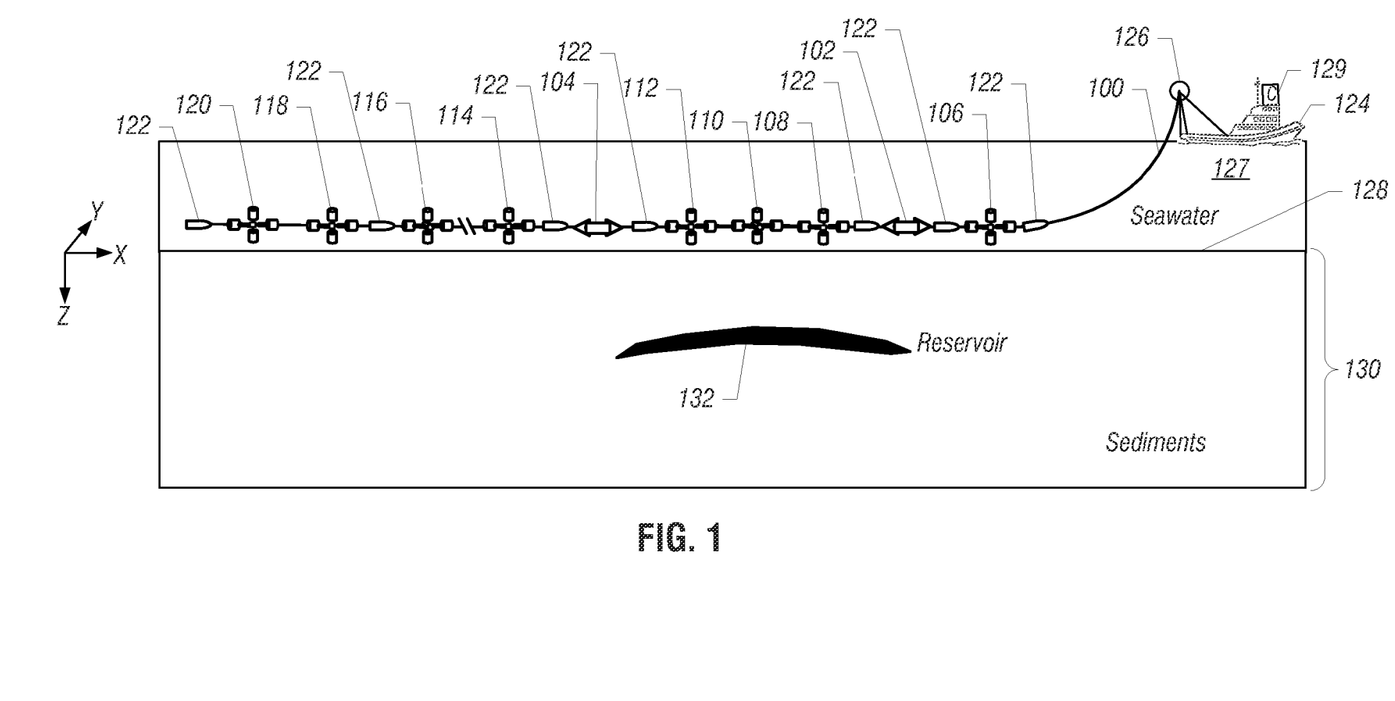
FIGS. 1-5 illustrate various configurations in accordance with embodiments of the present disclosure that include one or more tow cables coupled to streamers having EM sources and EM receivers.

FIG. 1 illustrates one example configuration that includes a tow cable 100 that has plural EM sources 102 and 104, along with plural EM receivers 106, 108, 110, 112, 114, 116, 118 and 120. The number of sources and/or receivers depicted in FIG. 1 is provided for purposes of example, as different numbers of sources and/or receivers can be used in other implementations. The tow cable 100 is towed by a sea vessel 124 at the sea surface. The sea vessel 124 has a reel 126 from which the tow cable 100 can be unwound for deployment into a body of water 127.

The sea vessel 124 can include a controller 129, which can be implemented with a computer, to perform data processing on measurements collected by EM receivers. Alternatively, the controller 129 can be located remotely, such as at a land location.

The tow cable 100 also includes steering devices 122 arranged at various positions along the tow cable. The steering devices 122 can also be referred to as "steering fish." The steering devices 122 are controllable to steer the tow cable 100 such that the tow cable travels in a desired direction. Note the number of steering fish employed may be dependent on the length of the tow cable and the desired degree of accuracy to which the sensor positions are maintained.

The body of water 127 sits above a sea floor 128, under which is located a subterranean structure 130. In the example of FIG. 1, a resistive body 132 is located at some depth below the sea floor 128, where the resistive body 132 can be a target body of interest, such as a hydrocarbon-bearing reservoir, a fresh water aquifer, a gas injection zone, a reservoir that contains methanehydrate deposits, a thin carbonate, or a salt-bearing layer, and so forth. Note that plural resistive bodies may be present at various depths in the subterranean structure 130.

A towed marine cable system comprised of the arrangement of the sea vessel 124 and the tow cable 100 enables EM measurements taken by the EM receivers 106-120 in response to EM signals generated by the EM sources 102 and 104. EM signals generated by the EM sources 102 and 104 are affected by structures within the subterranean structure 130, such as by the resistive body 132. As a result, a signal detected at an EM receiver mounted on the tow cable 100 is representative of such effect on generated EM signals. Each EM receiver can include a sensor module that has sensing elements to sense one or more of electric fields, electric currents and magnetic fields. In some cases, the sensing elements can be arranged to measure electric fields and/or magnetic fields in multiple different axes, referred to as the x, y, and z axes, where the x and y axes are the horizontal axes (generally parallel to the sea floor 128), and the z axis is the vertical axis (generally parallel to the depth direction into the subterranean structure 130).

Although reference is made to the horizontal and vertical orientations, it is noted that such reference is made with respect to the arrangement depicted in the various figures, where the sea floor 128 is assumed to be flat and has a perfectly horizontal orientation. However, it is noted that in practical applications, the sea floor 128 will usually have a non-planar surface, and in fact, can have some slope (or can even be vertical). In such cases, the "horizontal" and "vertical" orientations are intended to refer to relative orientations with respect to the non-horizontal sea floor.

Each EM source and/or receiver can be a single-component device (to emit or receive an electric or magnetic field) up to a six-component device (with components to emit or receive three electric and three magnetic fields), or any multi-component device. The components of each EM source or receiver can be excited at a number of frequencies.

The EM sources 102 and 104 can be horizontal electric dipole transmitters. In other implementations, other types of EM sources can be used, such as a horizontal magnetic dipole transmitter. Also, non-dipole transmitters can be used in further implementations.

In one example, the towed marine cable system can make EM measurements continuously using different combinations of multiple EM sources and EM receivers on the tow cable 100. Also, the source-receiver combinations can be optimized to maximize the response at different depths or positions.

In the arrangement of FIG. 1, note that EM receivers 108, 110, and 112 are positioned between EM sources 102 and 104. For EM receivers 108, 110, and 112, the dipole moments of the EM sources 102 and 104 can be controlled such that horizontal electric fields at the EM receivers 108, 110 and 112 are substantially cancelled (except for perturbations caused by two-dimensional or three-dimensional effects). As a result, based on control of the dipole moments of the EM sources 102 and 104, the primary electric field that is detected at each of the EM receivers 108, 110 and 112 is a vertical electric field. Note that vertical electric field data (corresponding to electric fields in the z direction) is sensitive to resistive bodies at depth, whereas horizontal electric fields are not sensitive to resistive bodies at depth. The vertical electric field data can be analyzed for different source separations to characterize conductivity changes with depth. Also, EM receivers that can measure horizontal EM field data, such as the EM receivers 106, 114, 116, 118 and 120 outside the region of the tow cable 100 between the EM sources 102 and 104, can be used to characterize lateral changes.

Thus, in the arrangement of FIG. 1, the different combinations of EM sources and receivers can include a first combination that has EM sources 102, 104, and EM receivers 108, 110, 112 between the EM sources 102 and 104. A second combination of EM sources and receivers includes EM sources 102, 104, and EM receivers 106, 114, 116, 118, and 120 outside the region of the tow cable between the EM sources 102 and 104. Other combinations of different EM sources and receivers can be defined. The different combinations of sources and receivers are used to collect different measurements that have different sensitivities (with some combinations being sensitive primarily to presence of resistive bodies at depth, and other combinations being sensitive to lateral changes).

FIG. 1 illustrates a relatively general configuration, where combinations of EM sources and EM receivers in the general configuration can be set by a user to achieve desired measurements. In a general sense, the source-receiver configuration, frequency of operation, waveform and post-acquisition data processing procedures can be designed for each survey separately using an optimization process. The known geologic parameters in the optimization process are the depth of sea water (including bathymetry) and its electrical conductivity, the geometry of the geologic structure beneath the sea floor, and the resistivity of various geologic structures. Note that these parameters are based on pre-survey estimates, or may be in part determined using information from seismic images and other geophysical data.

A computer algorithm (which can be executed by the controller 129) can compute the EM fields for various source positions, and searches through combinations of sources and/or receivers to find the source/receiver configurations that produce the largest scattered field at the receiver positions, or the largest incident field at the location of the target body (e.g., body 132 in FIG. 1). A scattered EM field refers to the EM field scattered from the subterranean structure 130 back up towards the EM receivers. Note in this context, the term "scattered field" can represent either the field with the target body minus the field without the target body, or the field with the target body normalized by the field without the target body. The algorithm may also be designed to focus energy at different depths, thus providing the ability to combine the single measurements in different configurations to provide a variety of different depth sensitivities.

Based on the output of the computer algorithm, the arrangement of EM sources and EM receivers as in FIG. 1 can be defined to achieve desired depth sensitivities and to provide focused energy at one or more depths in the subterranean structure 130. Also, the output of the computer algorithm allows for the frequency of operation, the waveform and post-acquisition data processing procedures to be defined.

Although the computer algorithm may employ many sources and a relatively small number of receivers on the towed cable, in reality it may be more power efficient to employ relatively many receivers and few sources. Such power efficiency can be accomplished by using the principle of reciprocity whereby sources are replaced by receivers with the same polarization, and vice versa. In other words, an EM source can be configured on an EM receiver by disabling the signal driving circuitry and instead using the elements of the EM source to receive signals.

In addition, data may be collected in a single channel (data from all receivers of the tow cable 100 being transmitted in the single channel and collected) rather than building a complicated source-receiver system having multiple channels. The collected data can be combined into the optimal configuration in a post-acquisition step.

Figure 2:
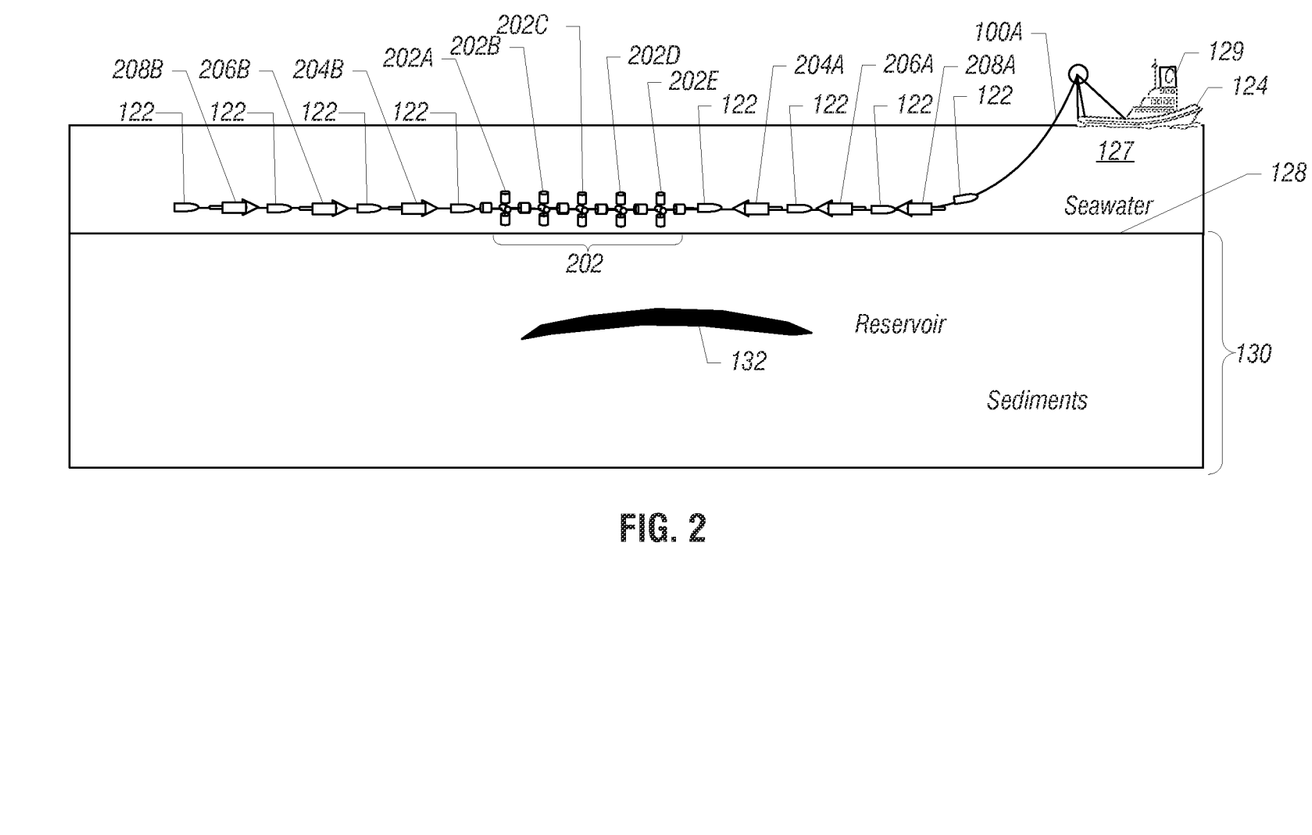

Another implementation of a tow cable with EM sources and receivers is depicted in FIG. 2, which shows a tow cable 100A having an array (202) of EM receivers 202A, 202B, 202C, 202D, 202E positioned between three pairs of EM sources, including a first pair 204A, 204B, a second pair 206A, 206B, and a third pair 208A, 208B.

The EM receivers 202A-202E can be multi-component EM receivers that are able to measure both electric and magnetic fields. In a different arrangement, some or all of the EM receivers 202A-202E can be single-component EM receivers that measure one of electric or magnetic fields.

In one implementation, the pairs of EM sources on the tow cable 100A are successively activated to enable measurements to be taken by the EM receivers in the array 202. For example, the first pair of EM sources 204A, 204B can be activated first, while the other EM sources remain off. Subsequently, the first pair of EM sources 204A, 204B is turned off and the second pair of EM sources 206A, 206B is activated (while the third pair of EM sources 208A, 208B remains off). Finally, the first and second pairs of EM sources 204A, 204B, and 206A, 206B are turned off, while the third pair of EM sources 208A, 208B is activated.

Thus, in the arrangement of FIG. 2, three source-receiver combinations are provided, where a first combination includes EM sources 204A, 204B, and the EM receivers 202A-202E; a second combination includes EM sources 206A, 206B and EM receivers 202A-202E; and the third combination includes EM sources 208A, 208B, and EM receivers 202A-202E. The different pairs of EM sources allow for responses at different depths in the subterranean structure 130 to be obtained.

Within each pair of EM sources, the dipole moments of the two EM sources in the pair are opposed (in other words, the dipole moments are provided in opposite directions such that the phases of the two EM sources are 180° out of phase). For example, if the pair of EM sources 204A, 204B is activated, then the dipole moment of EM source 204A is opposed to the dipole moment of EM source 204B. The electric current is thereby focused downwardly into the subterranean structure 130 such that the EM fields measured by the center EM receiver 202C in the array 202 extend in the vertical direction (z direction). The EM fields in the vertical direction have maximum sensitivity to the presence of the resistive body 132 when no lateral heterogeneity is present (in other words, variation in resistivity is assumed to be in a single direction, the z direction). In the absence of lateral heterogeneity, the EM fields measured at the EM receiver 202C in the center of the array 202 of receivers is entirely vertical (extends in the z direction). At the center position, the horizontal electric field (as well as the horizontal magnetic field) is zero. If lateral heterogeneity is present (e.g., there are variations in two or three dimensions), then perturbations due to such lateral heterogeneity will be detected by horizontal EM fields measured by the EM receivers.

In a shallow water environment, the focusing effect (in the vertical direction) is enhanced as the electrical current cannot flow upwardly into the air above the body of water 127.

In another implementation, instead of activating pairs of EM sources in a sequence, more than two EM sources can be activated at one time in a weighted fashion. Thus, generally, a plurality of EM sources are simultaneously energized in a weighted manner (e.g., the dipole moments of two sources are opposed) such that the electric current at the target location (e.g., resistive body 132) is along a predetermined direction (e.g., vertical direction) that provides maximum sensitivity when no lateral heterogeneity is present.

Measurements made by EM receivers (202A, 202B, 202D, 202E) symmetric about the center receiver 202C can be combined to yield additional sensitivity to lateral changes. Measurements of the vertical electric field by the center EM receiver 202C are sensitive to changes with depth. As a result, by combining measurements of the vertical electric field with measurements of the horizontal electric and/or magnetic fields, sensitivity both to the lateral and depth extent of a subsurface target body can be determined.

Measurements taken using the arrangement of FIG. 2 can also be used to cancel or attenuate unwanted signal components, such as a signal component due to the air-wave effect. The air-wave effect is caused by an EM signal generated by an EM source that follows a path extending upwardly from the EM source to the sea surface 103, horizontally through the air, and then back downwardly through the body of water 127 to a receiver. The signal component due to the air-wave effect (also referred to as a lateral wave) is an undesirable signal component since such signal component does not contain information relating to the subterranean structure 130 being surveyed. The air-wave effect is more pronounced in a shallow water environment. The vertical electric field $E_z$ that is measured by the center EM receiver 202C is insensitive to the lateral wave. Also, by using centralized measurements of $E_x$ (the electric field in the x direction along the cable 100A), or by taking the difference between symmetric measurements of $E_x$ about the center point, the lateral wave can be cancelled out. This latter computation is a differentiating technique that is based on taking the difference of measurements by two or more receivers to remove unwanted signals from the total measured signals.

In yet another implementation, instead of arranging the EM receivers between EM sources, the positions of the EM receivers and EM sources can be swapped such that the EM sources are located in an array between EM receivers. Due to reciprocity, the same analysis for the arrangement where EM receivers are positioned between EM sources applies.

Figure 3:
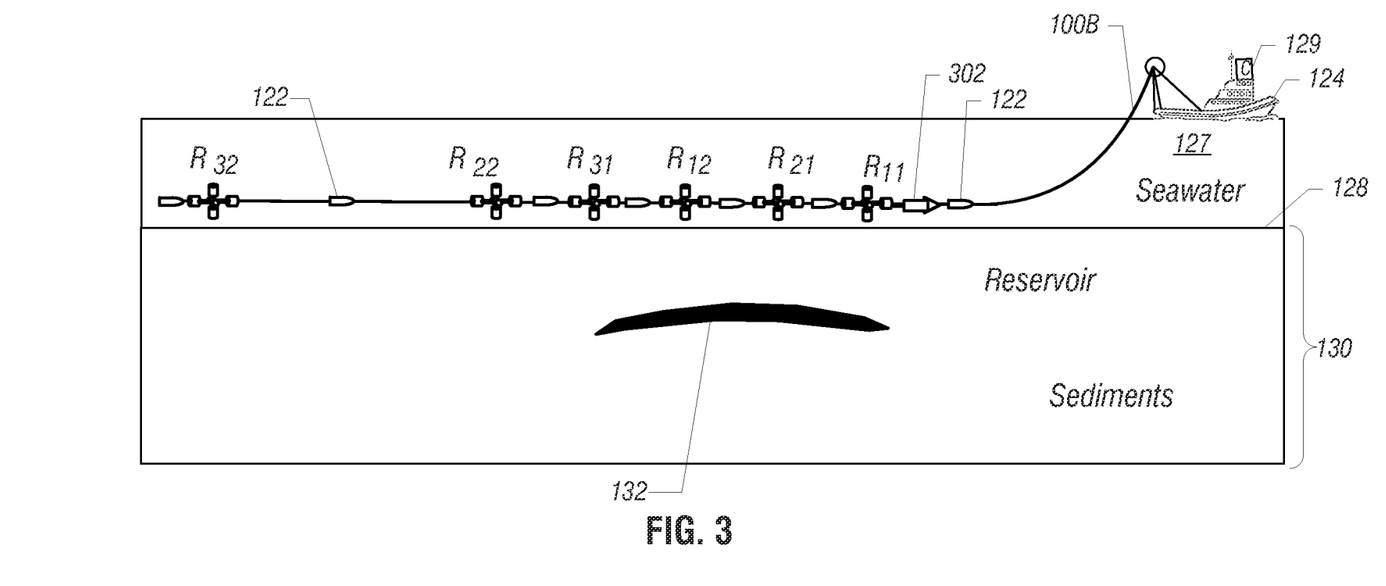

FIG. 3 shows an alternative configuration that has a tow cable 100B on which are mounted a single EM source 302 and multiple EM receivers, identified as $R_{11}$, $R_{21}$, $R_{12}$, $R_{31}$, $R_{22}$ and $R_{32}$. This configuration is referred to as a receiver-bucking configuration. The receivers are "paired-up" such that in each pair there is a receiver nearer the source and a receiver that is farther away from the source. The voltage measured by the receiver nearer the source is used to cancel, or "buck-out," unwanted signals in the far receiver. The unwanted signal can be the signal generated due to sea water, due to the air-wave effect, and/or due to near-sea floor sediments. In one example, consider receiver-pair $R_{11}$ and $R_{12}$, as depicted in FIG. 3. If the receiver moment for the two receivers are identical, then the data can be combined in the following manner: R1=$R_{12}$–a $R_{11}$, where a (a bucking coefficient) is a constant that is less than unity to force R1 to zero for a predetermined condition.

Different combinations of sources and receivers can give different depth penetrations. Additional bucking measurements can be made by employing R2=$R_{22}$–b$R_{21}$ and R3=$R_{32}$–c$R_{31}$, where b and c are also bucking coefficients. Due to the larger offset both from the source, and from each other, R2 and R3 progressively sense deeper into the subterranean structure.

A variety of techniques can be used to calculate the bucking coefficients (a,b, and c). One technique uses measurements collected with the array in a calibration region of known structure away from the zone of interest. The calibration region can be a region having a subterranean structure similar to the subterranean structure being surveyed, except that the subterranean structure of the calibration region does not include the resistive body 132. The coefficients are then calculated such that the bucked-measurements R1, R2, R3 are zero in this region. Once the bucking coefficients have been calculated based on measurements in the calibration region, the tow cable 100B can be moved to the region being surveyed to take measurements. As a post-acquisition processing step (either immediately as the data is being collected or sometime later), the measurement data from the individual receivers can be combined as described above to obtain R1, R2, R3. Non-zero values would then indicate the presence of structure (e.g., resistive body) that is different than that in the calibration region.

A second technique of calculating the bucking coefficients involves an adaptive-numerical processing procedure in which a 1D, 2D, or 3D numerical model is created that includes known sea water conductivity as well as sea floor bathymetry. An average sea floor conductivity is then assigned to the entire halfspace below the sea floor 128. In a post-acquisition step, the model response is then computed for the known source-receiver geometry at each new cable position along the tow cable, and the bucking coefficients are computed to cancel the fields as calculated from this numerical model. The model allows the bucking coefficients to be computed without the presence of the resistive body 132. Subsequently, the bucked fields measured by the receivers sense conductivity differences between the true subsurface (the subterranean structure 130 with the resistive body 132 present) and the uniform seabed conductivity of the model (without any resistive body). This method has the advantage that it incorporates the geometrical changes in source and receiver orientations, distance from sea floor, and bathymetry as the tow cable changes positions.

Alternatively, the bucking can actually be built into the hardware such that the moments of the individual receivers are manipulated and the results summed electronically as the measurements are collected rather than digitally at a later time.

Figure 4:
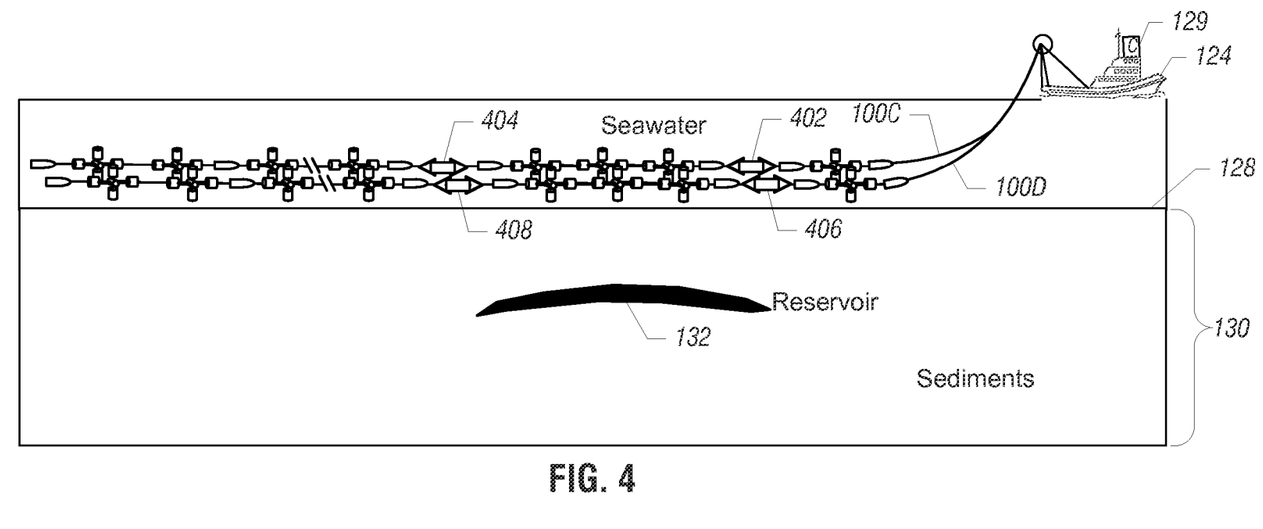
Figure 5:
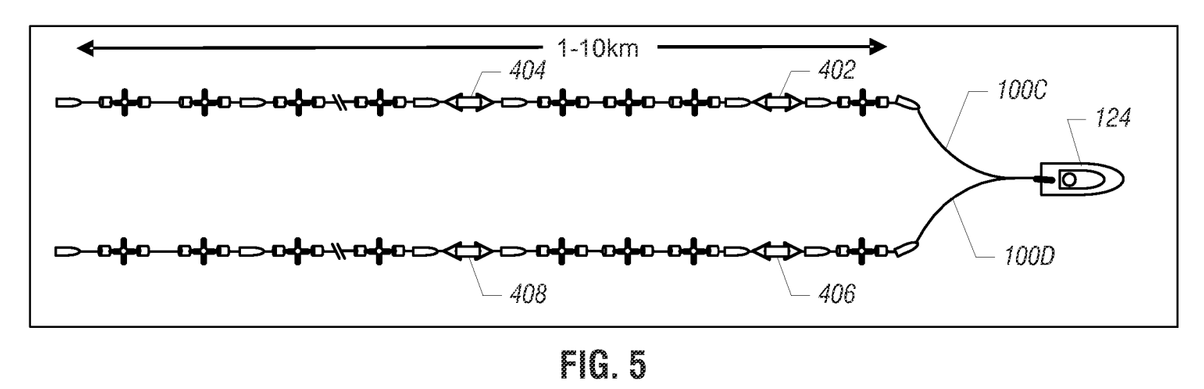

Any of the above configurations can employ a multi-streamer configuration, such as a dual-streamer configuration shown in FIGS. 4 and 5 (where FIG. 4 is a side perspective view and FIG. 5 is a top view). The dual-streamer configuration has two tow cables 100C and 100D, where each tow cable 100C has two EM sources and a number of EM receivers (similar to the arrangement of EM sources and EM receivers depicted in FIG. 1). The tow cable 100C includes EM sources 402, 404, and EM receivers, and the tow cable 100D includes EM sources 406, 408, and EM receivers.

The benefit of the multi-streamer configuration is that it allows for cross-line electric sources and measurements. In other words, sources (e.g., sources 402, 406) that are located the same distance behind the sea vessel 124, but on different streamers, can be used to transmit current between the two cables. To achieve the cross-line measurement, a signal source (such as a signal source on the sea vessel) can be controlled to cause current to pass from one tow cable to the other tow cable. Such arrangement causes the dipole moment at each of the pair of EM sources at the same distance behind the sea vessel, but on different streamers, to be perpendicular to the trajectory of the sea vessel. Because the cross-line data is less sensitive to thin resistors at depth, the cross-line data can be used to better define background resistivities, which can be compared to resistivity identified by inline data to enable detection of a subterranean structure. The inline data refers to data acquired based on passing current through the EM sources inline with the tow cables.

Figure 6A:
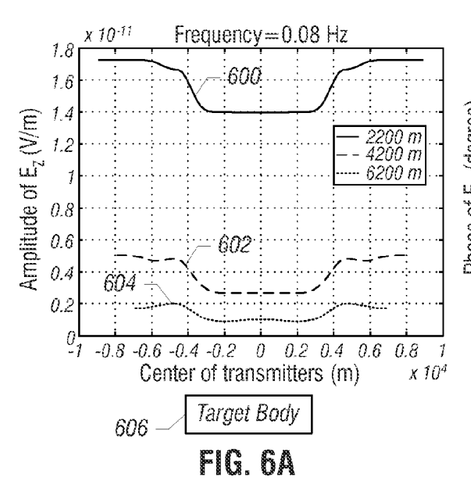
FIGS. 6A and 6B are graphs illustrating curves of amplitudes and phases of vertical electric fields acquired using the configuration of FIG. 2 in accordance with one or more embodiments of the present disclosure.
Figure 6B:
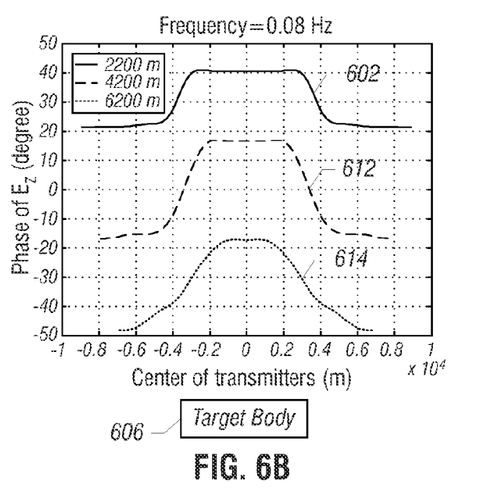

FIGS. 6A and 6B are graphs illustrating simulations performed for the configuration of FIG. 2. FIG. 6A plots the amplitude of the vertical electric field ($E_z$) against distance from the center (represented as zero on the horizontal axis) of the array 202 between the EM sources. Curve 600 illustrates the response for a first distance between EM sources (of a first pair), curve 602 illustrates the response for a second, greater separation between EM sources (of a second pair), and curve 604 represents the response for a third separation (greater than the second separation) between EM sources (of a third pair). A box 606 underneath the graph of FIG. 6A indicates the horizontal extent of the target body 132.

FIG. 6B plots the phase of $E_z$ as a function of distance from the center (zero) of the array 202 between EM sources. Curves 610, 612 and 614 correspond to the three different separations of EM sources discussed above for FIG. 6A.

Figure 7A:
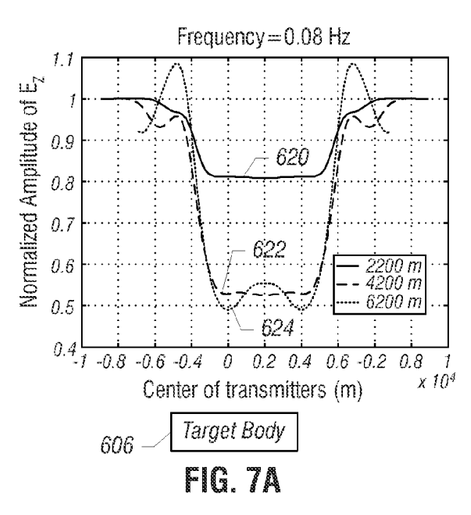
FIGS. 7A and 7B are graphs illustrating normalized amplitudes and phases based on curves in FIGS. 6A and 6B, in accordance with one or more embodiments of the present disclosure.
Figure 7B:
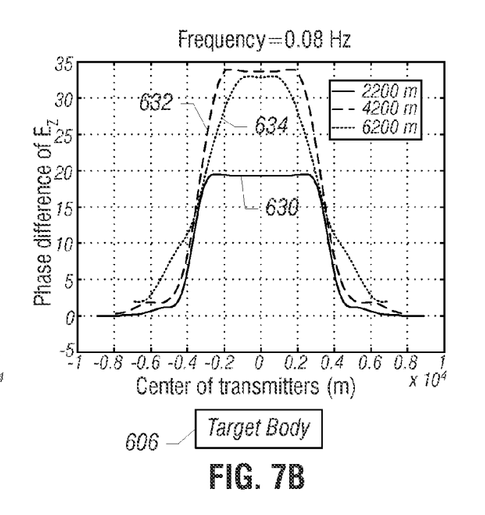

FIGS. 7A and 7B depict curves (620, 622, 624 in FIG. 7A and 630, 632, 634 in FIG. 7B) that represent normalized amplitudes and phases, respectively, as functions of distance from center of array. Note that the amplitudes and phases are normalized to a calculated amplitude and phase using a model. The curves 620, 622 and 624 represent normalized amplitudes with increasing offset between sources, and the curves 630, 632 and 634 represent normalized phases with increasing offset between sources. The curves indicate that the system is more sensitive to the target body 132 with larger source separations.

Figure 8:
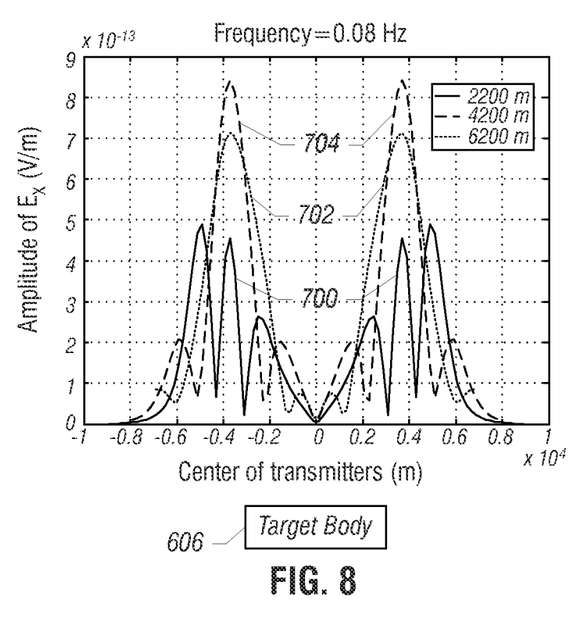
FIG. 8 is a graph showing curves that represent amplitudes of horizontal electric fields in accordance with one or more embodiments of the present disclosure.

FIG. 8 shows curves that represent the $E_x$ amplitude as a function of distance from the center (zero) of the array 202. Three curves 700, 702 and 704 are depicted to represent different separations between EM sources. Note that the $E_x$ response peaks at the edges of the target body, and approaches zero near the center, demonstrating how $E_x$ is more sensitive to lateral changes, but is not sensitive to changes with depth when the configuration of FIG. 2 is employed.

In the various examples discussed above, either frequency domain or time domain analysis can be performed. In frequency domain analysis, the response at different frequencies is determined in a data processing step. With time domain analysis, however, the transient response is monitored, in which the EM source(s) are turned on and then subsequently deactivated, with the response after deactivation of the EM source(s) monitored to detect for presence of resistive bodies in a subterranean structure. A benefit of time domain transient analysis is that distances between sources on the tow cable can be shortened as compared to distances for frequency domain analysis.

An alternative to building a measurement system that focuses the fields at a specific target depth is to synthetically focus the data in a post-acquisition processing step. One example method employs a linearized form of the Lipman-Schwinger integral equation governing the electric or magnetic field, $\psi(\bar{r},\bar{r}_s)$, which is governed by the equation:

$$\psi(\bar{r},\bar{r}_s)=\psi_b(\bar{r},\bar{r}_s)+\int d\bar{r}' g_b(\bar{r},\bar{r}')Q(\bar{r}')\psi_b(\bar{r}',\bar{r}_s), \quad \text{(Eq. 1)}$$

where $\psi_b(\bar{r},\bar{r}_s)$ is the background field, $Q(\bar{r})=\sigma(\bar{r})-\sigma_b(\bar{r})$ is the conductivity of the anomaly (e.g., resistive body 132), and $\sigma(\bar{r})$ is the conductivity distribution in the subterranean structure while $\sigma_b(\bar{r})$ is the conductivity distribution in the background (in the absence of the anomaly). The location of the observation point (receiver location) is denoted by $\bar{r}$ while that of the source is denoted by $\bar{r}_s$. The parameter $\bar{r}'$ denotes a location inside the anomaly. The function $g_b(\bar{r},\bar{r}')$ is the Green function of the background medium.

The electric or magnetic field $\psi(\bar{r},\bar{r}_s)$ is the measured electric or magnetic field by EM receivers, which can be receivers in any of the arrangements discussed above or in other arrangements. At a discrete number of measurements (M) corresponding to different transmitter-receiver pairs $[\{\bar{r},\bar{r}_s\}_i, i=1, \ldots, M]$, the following is derived:

$$\int d\bar{r}' K_i(\bar{r}')Q(\bar{r}')=m_i, i=1, \ldots, M, \quad \text{(Eq. 2)}$$

where $$K_i(\bar{r}')=g_b(\bar{r}_i,\bar{r}')\psi_b(\bar{r}',\bar{r}_{si}), \text{ and} \quad \text{(Eq. 3)}$$

$$m_i=\psi(\bar{r}_i,\bar{r}_{si})-\psi_b(\bar{r}_i,\bar{r}_{si}) \quad \text{(Eq. 4)}$$

For the purpose of focusing the measurements, the above measurement equation (Eq. 2) is multiplied by $w_i K_i^*(\bar{r})$ and summed over all weighted measurements, where $\{w_i, i=1, \ldots, M\}$ is a set of weights to be determined later. The following is thus obtained:

$$\int d\bar{r}' G(\bar{r},\bar{r}')Q(\bar{r}')=D(\bar{r}), \quad \text{(Eq. 5)}$$

where $$G(\bar{r},\bar{r}')=\sum_{i=1}^{M} w_i K_i(\bar{r}')K_i^*(\bar{r}) = G^*(\bar{r}',\bar{r}), \text{ and} \quad \text{(Eq. 6)}$$

$$D(\bar{r}) = \sum_{i=1}^{M} w_i m_i K_i^*(\bar{r}). \quad \text{(Eq. 7)}$$

The weights $\{w_i, i=1, \ldots, M\}$ are chosen such that $G(\bar{r},\bar{r}')$ is highly peaked at $\bar{r}'=\bar{r}$, approximating a delta function. In other words:

$$G(\bar{r},\bar{r}')\approx\delta(\bar{r}-\bar{r}'). \quad \text{(Eq. 8)}$$

By selecting the weights in this manner, the focused depth is the depth of the anomaly (e.g., resistive body 132). In this case, the following is obtained:

$$Q(\bar{r}) \approx D(\bar{r}) = \sum_{i=1}^{M} w_i m_i K_i^*(\bar{r}). \quad \text{(Eq. 9)}$$

Hence, in doing so, the measurements have been focused in software to provide a direct estimate of $Q(\bar{r})$, which is the conductivity of the anomaly (e.g., the resistive body 132). The focusing is done by designing the weights $\{w_i, i=1, \ldots, M\}$ such that:

$$\sum_{i=1}^{M} w_i K_i(\bar{r}')K_i^*(\bar{r}) \approx \delta(\bar{r}-\bar{r}'). \quad \text{(Eq. 10)}$$

Figure 9:
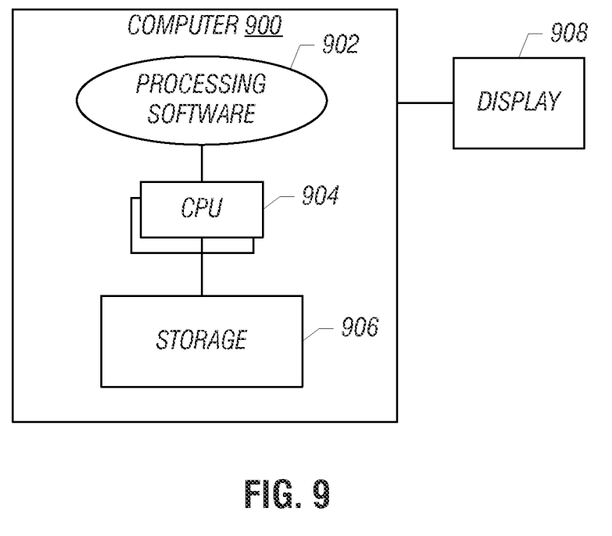
FIG. 9 is a block diagram of a computer including software configured in accordance with one or more embodiments of the present disclosure.

FIG. 9 shows a computer 900 in which processing software 902 is executable to perform any of the tasks discussed above. The processing software 902 is executable on one or more central processing units (CPUs) 904, which is connected to a storage 906. Results provided by the processing software 902 can be output to a display 908, or alternatively, can be communicated over a network to a remote client for output.

Data and instructions (of the software) are stored in respective storage devices (e.g., storage 906 in FIG. 9), which can be implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the present disclosure has been made with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of characterizing a subsurface marine environment, comprising:
deploying a surveying assembly in a body of water, said surveying assembly comprising a tow cable, one or more streamers coupled to the tow cable, and a plurality of EM sources and a plurality of EM receivers attached to a first streamer of the one or more streamers, wherein at least two of the EM receivers are arranged between a pair of the EM sources, wherein each of the at least two EM receivers is a multi-component receiver to measure electric fields in plural directions;
activating at least one of the EM sources; and
in response to activation of the at least one EM source, acquiring measurement data from the EM receivers.

2. The method according to claim 1, wherein the measurement data comprises at least one of 1) measurement data surveyed in a calibration region lacking a target body of interest, and 2) a model.

3. The method according to claim 1, further comprising:
determining weighting for application to the measurement data; and
based on the weighting, focusing measurement of measurement data to a target depth in the subsurface marine environment.

4. The method according to claim 3, wherein determining the weighting comprises computing weights such that a sum of weighted measurements peaks at a location in the subsurface marine environment at the target depth in the subsurface marine environment.

5. The method according to claim 3, further comprising directly estimating conductivity of the subsurface marine environment at the target depth based on the focused, weighted measurement data.

6. The method according to claim 1, further comprising:
sequentially activating the EM sources, thereby enabling acquisition of measurement data by the EM receivers, focusing at a plurality of depths in the subsurface marine environment.

7. A method of removing a target signal component from a total electromagnetic (EM) field measured by a towed marine EM system, comprising:
receiving, by a system including a processor, measurement data acquired by a pair of EM receivers in response to activation of an EM source, the pair of the EM receivers provided about the EM source, wherein a first EM receiver of the pair is nearer to the EM source relative to a second EM receiver of the pair, such that a voltage measured by the first EM receiver cancels out a signal component in the second EM receiver;
calculating, by the system, a bucking coefficient based on the measurement data; and
removing, by the system, the target signal component at the EM receivers based on the bucking coefficient.

8. The method according to claim 7, wherein the measurement data comprises at least one of 1) measurement data surveyed in a calibration region lacking a target body of interest, and 2) a model.

9. A method of removing target signal components from a total electromagnetic field measured by a towed marine EM system, comprising:
receiving, by a system including a processor, measurement data acquired at each of a plurality of pairs of EM receivers in response to activation of an EM source, wherein the plurality of pairs of the EM receivers are provided about the EM source;
calculating, by the system, a bucking coefficient for each pair based on the measurement data; and
removing, by the system, the target signal components at the EM receivers based on the bucking coefficients.

10. The method of claim 1, wherein each of the EM sources in the pair has a corresponding dipole moment.

11. The method according to claim 1, wherein the at least two EM receivers arranged between the pair of EM sources comprise an array of EM receivers including a particular EM receiver configured to measure a vertical electric field, resulting in increased sensitivity to changes in depth in a subsurface structure.

12. The method according to claim 1, wherein the EM sources of the pair are configured to cause attenuation of a horizontal electromagnetic field at a particular EM receiver of the at least two EM receivers.

13. The method according to claim 1, wherein more than two EM receivers are provided between the pair of EM sources.

14. The method of claim 7, wherein removing the target signal component comprises removing an air-wave effect signal component.

15. The method of claim 9, wherein removing the target signal components comprises removing air-wave effect signal components.

* * * * *